Oct. 21, 1924.   1,512,406
J. E. CHAMBERS ET AL
SAND CUTTER
Filed Nov. 26, 1920   3 Sheets-Sheet 1
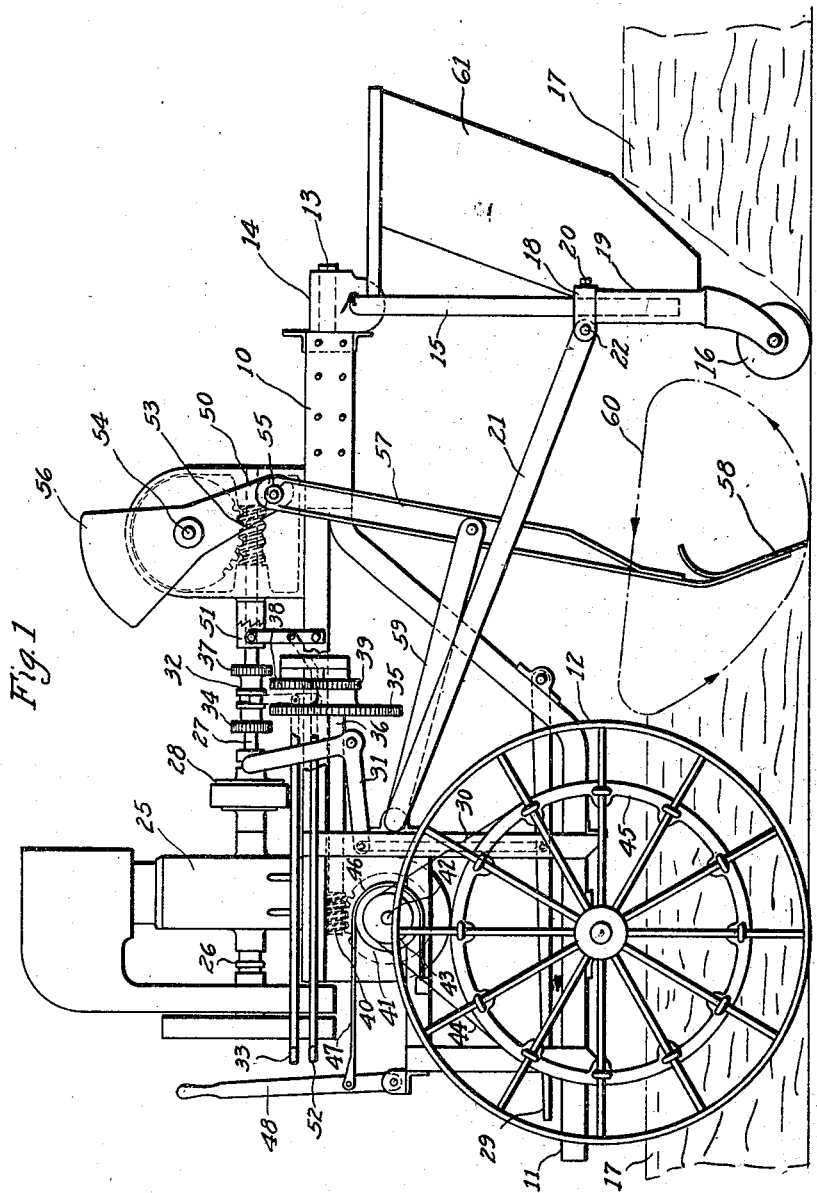
Inventors
John E. Chambers and
Emmett L. Van Dolsen,
By
Hood & Ashby.
Attorneys

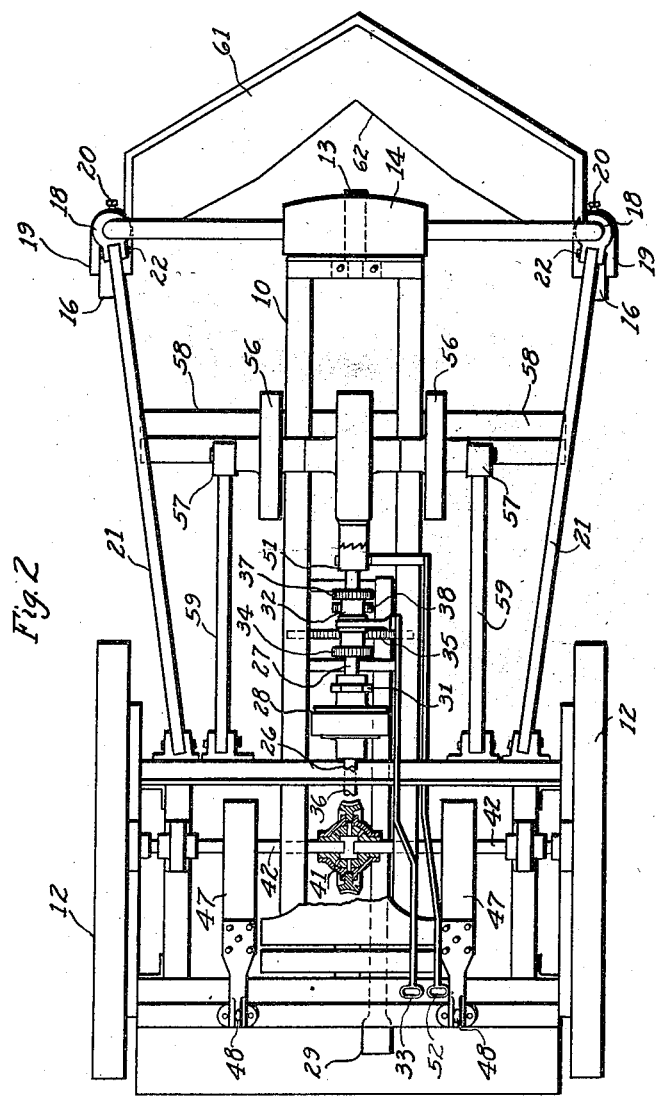

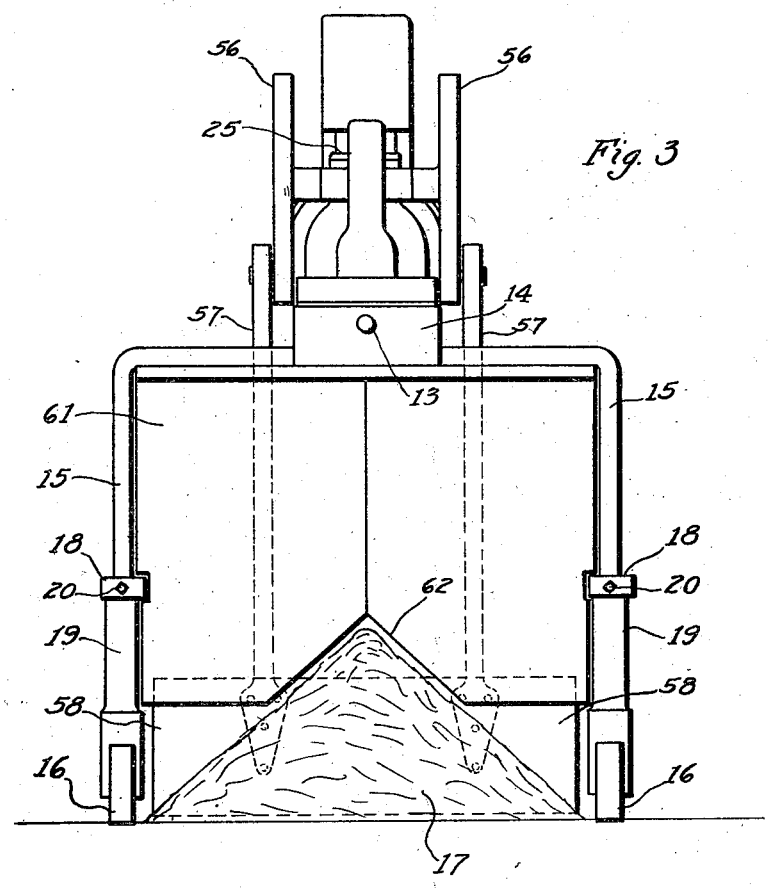

Patented Oct. 21, 1924.

1,512,406

UNITED STATES PATENT OFFICE.

JOHN E. CHAMBERS AND EMMET L. VAN DOLSEN, OF SHELBYVILLE, INDIANA.

SAND CUTTER.

Application filed November 26, 1920. Serial No. 426,390.

*To all whom it may concern:*

Be it known that we, JOHN E. CHAMBERS and EMMET L. VAN DOLSEN, citizens of the United States, residing at Shelbyville, in the county of Shelby and State of Indiana, have invented a new and useful Sand Cutter, of which the following is a specification.

It is the object of our invention to produce a simple, effective, and economical sand-cutting machine, for foundry use, which machine can be operated along the sand row to shovel the sand, or without shoveling the sand and with the shovel clear of the sand without any special elevating means, and by which the sand when being shoveled will be thrown against a screen which assists in breaking up the sand and also causes it to drop to form a smooth ridged row as the machine travels.

The accompanying drawings illustrate our invention: Fig. 1 is a side elevation of a sand-cutting machine embodying our invention, with some of the parts broken away or in section; Fig. 2 is a plan of such machine; and Fig. 3 is a front elevation of such machine.

A main tractor frame 10 provided at the rear with a step 11 on which the operator may stand is supported at the rear by two traction wheels 12, and at the front has a forwardly projecting pivot pin 13 on which is pivotally mounted a casting 14 which in turn has pivotally mounted in it on a horizontal transverse axis an inverted U-shaped front frame 15 on the downwardly extending arms of which are two caster wheels 16. Both the front and the rear wheels are separated sufficiently far apart to straddle the row of sand 17. The pivot mounting 13 permits the front frame 15 to tilt relatively to the main frame 10 as may be required by unevenness of the floor, while still permitting all four supporting wheels to remain on the ground. The front frame 15 is preferably vertically adjustable with respect to the caster wheels 16, by having collars 18 for the upper ends of the caster wheel frames 19 to bear against, which collars 18 are vertically adjustable along the arms of the frame 15 and clampable thereto by set-screws 20 in any desired position. The collars 18 are connected to the rear part of the main frame 10 by links 21, pivoted to such main frame and to such collars on loose pivot pins 22 which permit relative movement in more than one plane.

Mounted on the frame 10 is a suitable engine 25, or other source of power, the driving shaft 26 of which may be connected to or disconnected from an alined shaft 27 by a clutch 28, which is controlled by a foot pedal 29 connected to its movable member by a link 30 and bell-crank 31 or other suitable connection. A sleeve 32 is splined on the shaft 27 and shiftable along it by a push rod 33 in either direction from the neutral position shown to produce rapid forward driving by causing intermeshing of a pinion 34 with a gear 35 on a countershaft 36 or less rapid rearward driving by causing the intermeshing of a pinion 37 with an idler 38 meshing with a gear 39 also fixed on the shaft 36 but smaller than the gear 35. The shaft 36 has a worm-drive connection 40 to a differential 41, from which project laterally two differential shafts 42 each provided with a small driving pulley or sprocket 43 connected by a belt or chain 44 to a larger pulley or sprocket 45 on the corresponding traction wheel 12. Each differential shaft 42 has a brake drum 46, with which is associated a brake band 47 operable by a lever 48 accessible to the operator. By manipulating the brake lever 48, of which there is one for each side, the operator may steer the machine as desired.

Alined with the shaft 27 is still another shaft 50, which is connectible to, and disconnectible from the shaft 27 by a jaw clutch 51 operable by a pull rod 52, also accessible to the operator. The shaft 50 is connected by worm gearing 53 to a transverse shaft 54, on opposite ends of which are two cranks 55 provided with counterweights 56. The cranks 55 are pivotally connected to the upper ends of two rods 57, which correspond to shovel handles and which at their lower ends are attached to one or more shovel blades 58, which if more than one move as one. Links 59 connect intermediate points of the rods 57 with the main frame 10. As a result, when the transverse crank 54 is in operation, the lower edge of the blade or blades 58 describes a path such as indicated by the chain line 60, the upper part of which is above the top of the sand row 17; so that when the blade 58 is stationary at the upper part of its path the machine may be moved forward or rearward without interference between the sand row and the blade, and when the blade 58 is in motion and the machine is moving rearward the blade cuts into the sand row 17 and scoops up the sand and throws it directly forward, or in the opposite direction to the movement of the machine, the movement of the blade or blades 58 being in the plane of the machine movement.

In order that the shoveled sand may be broken up even more than by the shoveling action, and that the shoveled sand may be piled in a smooth ridged row instead of being scattered, the front frame 15 carries an imperforate slanting hopper-shield 61, which is conveniently made of sheet metal and in cross-section (Fig. 2) is in the form of a flattened V with its apex forward. This hopper-shield is slanted so that its upper end is farther forward than its lower end. The sand thrown by the shovel 58 strikes the hopper-shield 60, and is broken up by such striking; and this sand is prevented from being scattered by the hopper-shield, and when it strikes the hopper-shield slides downward therein and drops from the lower edge thereof. Because of the V shape and of the slant of this hopper-shield, the sand not only slides downward but also slides toward the center of the shield, so that when it drops from the shield as the machine travels backward during the cutting operation the sand forms a smooth ridged row. Preferably the hopper-shield is provided at the bottom with a central inverted V-shaped notch 62, the sides of which preferably correspond to the natural slope of the sand, thus permitting the hopper-shield to extend downward on the sides of the sand row 17.

When it is desired to cut or temper a row of sand, the machine is fed forward astride such row, with the shovel 58 stopped in the upper part of its path 60 so that it clears the top of the sand row. This is obtained by a proper manipulation of the push rods 33 and 52 and of the foot pedal 29. This forward movement may be relatively rapid, as no cutting of the sand is being done. When the front end of the row has been reached, the direction of travel of the machine is reversed, by proper manipulation of the push rod 33 and foot pedal 29, to produce a slow rearward movement, and the shovel 58 is set into motion by throwing in the clutch 51 by the push rod 52. As the machine travels rearward, the shovel 58, traveling in its rearwardly-shifting path 60, cuts into the uncut sand 67 and throws successive shovel-fuls of such sand against the hopper-screen 61, which drops it in a smooth ridged row 17 of cut sand. The breaking up of the sand is obtained both by the shoveling action and by the striking of the sand against the hopper-screen.

We claim as our invention:

1. A sand-cutting machine, comprising a main frame having two supporting rear wheels, a front frame having two caster wheels and pivotally connected to the front end of said main frame to permit relative movement on both longitudinal and transverse axes, one or more links loosely connecting the two frames, and shoveling mechanism carried by said main frame and movable relatively thereto in its shoveling action.

2. A sand-cutting machine, comprising a main frame having two supporting rear wheels, a front frame having two caster wheels and pivotally connected to the front end of said main frame to permit relative movement on both longitudinal and transverse axes, one or more links loosely connecting the two frames, and shoveling mechanism carried by said main frame and movable relatively thereto in its shoveling action, said caster wheels and said front frame being relatively vertically adjustable.

3. A sand-cutting machine, comprising a main frame having two supporting rear wheels, a front frame having two caster wheels and pivotally connected to the front end of said main frame to permit relative movement on a longitudinal axis, and shoveling mechanism carried by said main frame and movable relatively thereto in its shoveling action.

4. A sand-cutting machine, comprising a movable carrying frame, a swinging shovel mounted thereon and movable both swingingly and vertically relatively to the frame in a plane paralleling the direction of machine travel, and an imperforate slanting hopper-shield arranged in front of said shovel to receive the sand thrown therefrom and let such sand slide down from the hopper-shield, the slant of said hopper-shield being such that it returns the sand toward the shovel.

5. A sand-cutting machine, comprising a movable carrying frame, a swinging shovel mounted thereon and movable both swingingly and vertically relatively to the frame in a plane paralleling the direction of machine travel, and an imperforate slanting hopper-shield arranged in front of said shovel to receive the sand thrown therefrom and let such sand slide down from the hopper-shield, the slant of said hopper-shield being such that it returns the sand toward the shovel, said slanting hopper-shield being V-shaped in cross-section to cause the downsliding sand to approach the middle of the shield.

6. A sand-cutting machine, comprising a movable carrying frame, a swinging shovel mounted thereon and movable both swingingly and vertically relatively to the frame in a plane paralleling the direction of machine travel, and an imperforate slanting hopper-shield arranged in front of said shovel to receive the sand thrown therefrom and let such sand slide down from the hopper-shield, the slant of said hopper-shield being such that it returns the sand toward the shovel, said slanting hopper-shield being provided with a notch in the bottom so that it may project down on the sides of a sand row.

7. A sand-cutting machine, comprising a movable carrying frame, a shovel movably mounted on said frame to pick up and throw sand which is in its path of travel, and an imperforate slanting hopper-shield arranged in front of said shovel to receive the sand thrown therefrom and let such sand slide down from the hopper-shield, the slant of said hopper-shield being such that it returns the sand toward the shovel.

8. A sand-cutting machine, comprising a movable carrying frame, a shovel movably mounted on said frame to pick up and throw sand which is in its path of travel, and an imperforate slanting hopper-shield arranged in front of said shovel to receive the sand thrown therefrom and let such sand slide down from the hopper-shield, the slant of said hopper-shield being such that it returns the sand toward the shovel, said slanting hopper-shield being V-shaped in cross-section to cause the down-sliding sand to approach the middle of the shield.

9. A sand-cutting machine, comprising a movable carrying frame, a shovel movably mounted on said frame to pick up and throw sand which is in its path of travel, and an imperforate slanting hopper-shield arranged in front of said shovel to receive the sand thrown therefrom and let such sand slide down from the hopper-shield, the slant of said hopper-shield being such that it returns the sand toward the shovel, said slanting hopper-shield being provided with a notch in the bottom so that it may project down on the sides of a sand row.

10. A sand-cutting machine, comprising a movable carrying frame, a shovel movably mounted on said frame to pick up and throw sand which is in its path of travel, and an imperforate shield in the path of the sand thrown from said shovel, said shield being arranged to cause the sand it receives to drop from it.

11. A sand-cutting machine, comprising a movable carrying frame, a shovel movably mounted on said frame to pick up and throw sand which is in its path of travel, and an imperforate shield in the path of the sand thrown from said shovel, said shield being arranged to cause the sand it receives to drop from it and to approach the middle of the shield as it drops.

12. A sand-cutting machine, comprising a movable carrying frame, a shovel movably mounted on said frame to pick up and throw sand which is in its path of travel, and an imperforate shield in the path of the sand thrown from said shovel, said shield being arranged to cause the sand it receives to drop from it, said shield being provided with a notch in the bottom so that it may project down on the sides of a sand row.

13. A sand-cutting machine, comprising a movable carrying frame, a shovel movably mounted on said frame to pick up and throw sand which is in its path of travel, and an imperforate shield in the path of the sand thrown from said shovel, said shield being arranged to cause the sand it receives to drop from it and to approach the middle of the shield as it drops, said shield being provided with a notch in the bottom so that it may project down on the sides of a sand row.

In witness whereof, we have hereunto set our hands at Shelbyville, Indiana, this 13th day of November, A. D. one thousand nine hundred and twenty.

JOHN E. CHAMBERS.
EMMET L. VAN DOLSEN.